(12) United States Patent
Nakamura (10) Patent No.: US 12,506,939 B2
(45) Date of Patent: Dec. 23, 2025

(54) IMAGE PICKUP APPARATUS WITH PLURALITY OF CONNECTORS CONNECTED TO EXTERNAL DEVICES

(71) Applicant: CANON KABUSHIKI KAISHA, Tokyo (JP)

(72) Inventor: Hiroshi Nakamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 18/628,902

(22) Filed: Apr. 8, 2024

(65) Prior Publication Data

US 2024/0348900 A1    Oct. 17, 2024

(30) Foreign Application Priority Data

Apr. 13, 2023    (JP) ................. 2023-065580

(51) Int. Cl.
 *H04N 23/50*    (2023.01)
(52) U.S. Cl.
 CPC .................. *H04N 23/50* (2023.01)
(58) Field of Classification Search
 CPC .............. H04N 23/50; H04N 23/51
 See application file for complete search history.

(56) References Cited

U.S. PATENT DOCUMENTS

| 11,115,566 | B2* | 9/2021 | Nunnink | H04N 23/51 |
| 2014/0098225 | A1* | 4/2014 | Rodriguez | H04N 23/51 |
| | | | | 348/370 |
| 2017/0078537 | A1* | 3/2017 | Peddecord | H04N 23/55 |
| 2017/0111553 | A1* | 4/2017 | Yamamoto | H04N 23/50 |
| 2022/0141359 | A1* | 5/2022 | Li | H04N 23/55 |
| | | | | 348/207.99 |

FOREIGN PATENT DOCUMENTS

JP            2002072321 A        3/2002

* cited by examiner

*Primary Examiner* — Amy R Hsu
(74) *Attorney, Agent, or Firm* — Cowan, Liebowitz & Latman, P.C.

(57) ABSTRACT

An image pickup apparatus in which a plurality of connectors can be arranged while preventing size increase. In an image pickup apparatus, a battery housing portion is arranged parallel to a lens barrel unit in a first direction perpendicular to the direction of an optical axis of the lens barrel unit so as not to overlap the lens barrel unit as seen from the direction of the optical axis. Connectors are arranged in at least two of four subareas formed by dividing an area excluding an area where the lens barrel unit is present from a first area surrounded by an outline of an exterior body of the image pickup apparatus and a virtual straight line and including the optical axis, as seen from the direction of the optical axis, where the virtual straight line passes through an end of the battery housing portion facing the lens barrel unit.

10 Claims, 5 Drawing Sheets

IMAGE PICKUP APPARATUS WITH PLURALITY OF CONNECTORS CONNECTED TO EXTERNAL DEVICES

BACKGROUND OF THE INVENTION

Field of the Invention

The present invention relates to image pickup apparatuses each equipped with connectors to be connected to external devices.

Description of the Related Art

A typical image pickup apparatus is equipped with a plurality of external interface connectors, such as a power supply connector for supplying power from the outside, an audio input connector to which an external microphone is connected, and an image output connector to which an external display is connected. Connecting cables to the respective connectors enables such an image pickup apparatus to use external devices for communication, power supply, and/or other purposes.

The size of an image pickup apparatus may be affected by the layout of connectors, and hence the layout of the connectors in the main body of the image pickup apparatus should be carefully designed. In a camera disclosed in Japanese Patent Laid-Open Publication (Kokai) No. 2002-072321, a power supply circuit board, a control circuit board, and external interface connectors are disposed in superposed manner behind a lens unit and on the opposite side of the lens unit across a main frame.

The camera disclosed in Japanese Patent Laid-Open Publication (Kokai) No. 2002-072321 is capable of preventing an increase in its size in a direction vertical to an optical axis. However, it may have a problem that the dimension of the camera is large in the direction of the optical axis. When a plurality of connectors is arranged in the camera, there is room for improvement in preventing an increase in the camera size in consideration of the relationship between the connectors and, for example, a lens barrel unit.

SUMMARY OF THE INVENTION

The present invention provides image pickup apparatuses in which a plurality of connectors can be arranged while preventing an increase in the size of the image pickup apparatuses.

According to an aspect of the invention, an image pickup apparatus includes an exterior body, a lens barrel unit, and a battery housing portion where a battery is to be housed. The battery housing portion is arranged parallel to the lens barrel unit in a first direction perpendicular to a direction of an optical axis of the lens barrel unit such that the battery housing portion does not overlap the lens barrel unit as seen from the direction of the optical axis. The image pickup apparatus further includes a plurality of connectors that is to be connected to external devices and is arranged within a range where the lens barrel unit extends in the direction of the optical axis. The plurality of connectors is arranged in at least two subareas among four subareas formed by dividing, by a first virtual straight line and a second virtual straight line, an area excluding an area where the lens barrel unit is present from a first area surrounded by an outline of the exterior body and a third virtual straight line and including the optical axis as seen from the direction of the optical axis, where the first virtual straight line is a virtual straight line parallel to the first direction and passing through the optical axis, the second virtual straight line is a virtual straight line parallel to a second direction perpendicular to the direction of the optical axis and the first direction and passing through the optical axis, and the third virtual straight line is a virtual straight line parallel to the second direction and passing through an end of the battery housing portion facing the lens barrel unit in the first direction, as seen from the direction of the optical axis.

According to the present invention, it is possible to arrange a plurality of connectors in an image pickup apparatus while preventing an increase in the size of the image pickup apparatus.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1A:
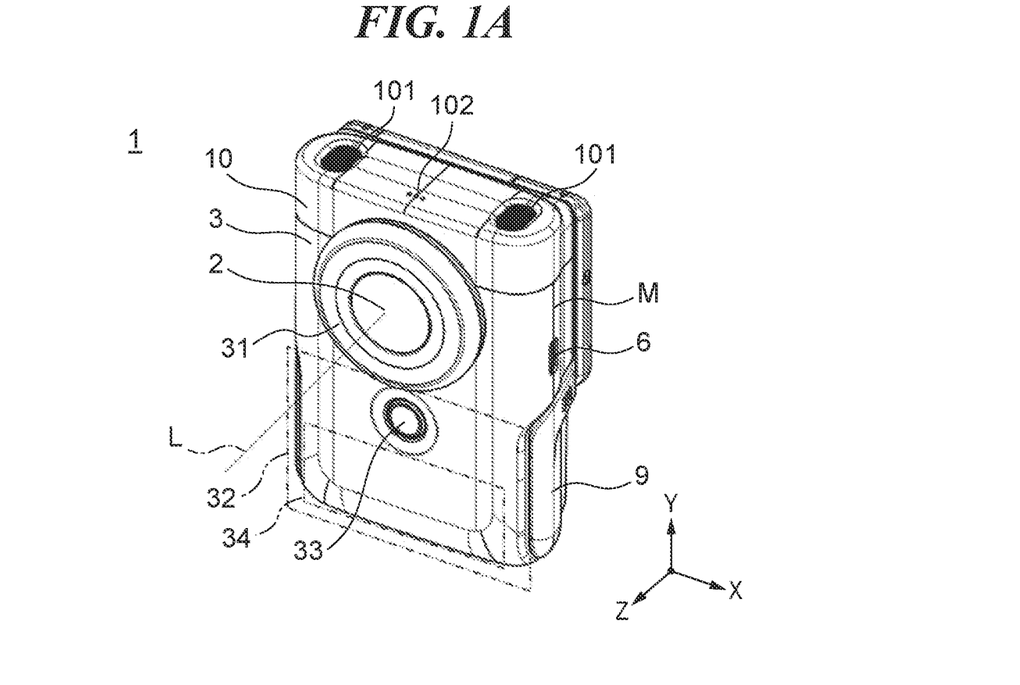
FIG. 1A and FIG. 1B are perspective views of a camera as an image pickup apparatus.
Figure 1B:
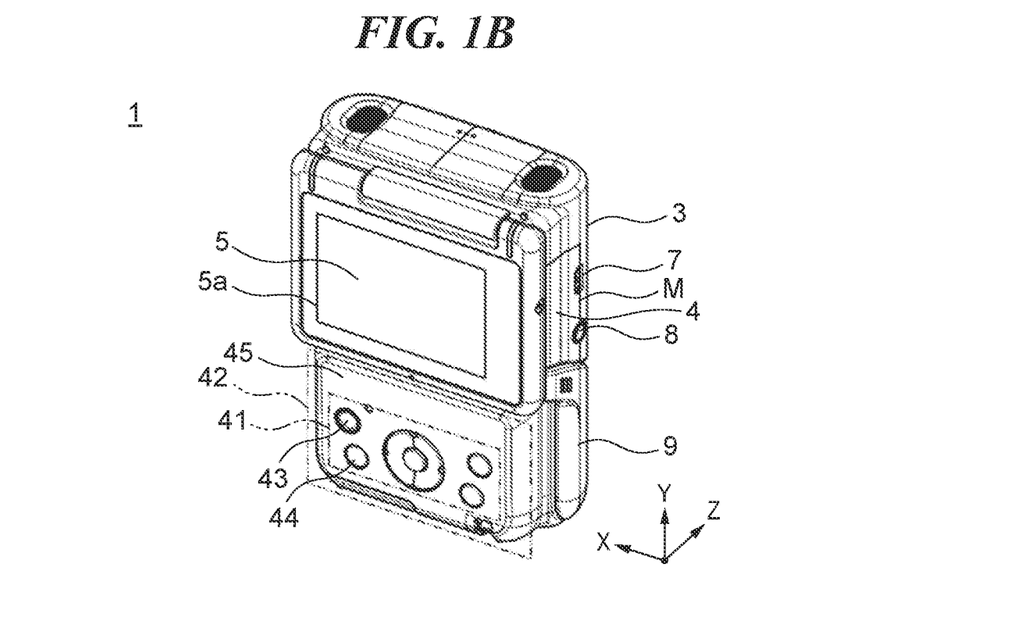

FIG. 1A and FIG. 1B are perspective views of an image pickup apparatus according to an embodiment of the present invention. In the present embodiment, a camera 1 is taken as an example of the image pickup apparatus. The optical axis of a lens barrel unit 2 which the camera 1 is equipped with is referred to as the optical axis L.

Figure 1C:
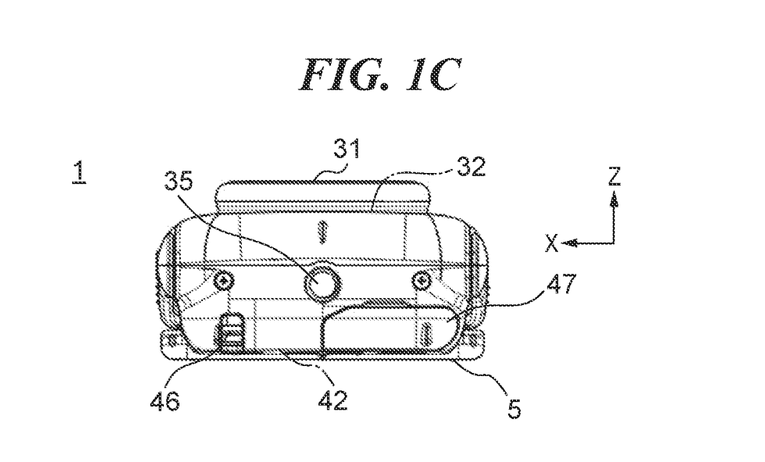
FIG. 1C is a bottom view of the camera.

In the following description, the directions of components are designated based on X, Y, and Z coordinate axes. For the sake of convenience, the side of a subject in a direction (Z direction) parallel to the optical axis L is referred to as the front. Accordingly, a +Y direction is upward, and a +Z direction is forward. A +X direction is leftward as seen from a photographer (rightward as seen from the subject side). Thus, FIG. 1A and FIG. 1B are a front perspective view and a rear perspective view, respectively, of the camera 1. FIG. 1C is a bottom view of the camera 1. The Z direction is parallel to the direction of the optical axis L (optical axis direction). An X direction and a Y direction are perpendicular to the optical axis direction.

The lens barrel unit 2 equipped with a shooting optical system is located at the front of the camera 1. The lens barrel unit 2 is a single-focus lens unit and is a well-known lens barrel unit with a shutter mechanism, a focusing mechanism, etc. Even when a user turns the power of the camera 1 to ON (to a use state), the lens barrel unit 2 does not extend.

The lens barrel unit 2 includes an image pickup device (which is not illustrated) configured to receive an optical image of a subject, which is formed through a plurality of taking lenses constituting the shooting optical system, and generate image data by photoelectrically converting the optical image. The image pickup device is comprised of a CCD sensor, a CMOS image sensor, or the like.

A front appearance of the camera 1 is formed by a front cover 3. On the periphery of the lens barrel unit 2, a front ring 31 projecting relative to the front cover 3 to the +Z side is provided. On the −Y side of the front ring 31, a front grip area 32 for a user to hold the camera 1 is located. Since the front ring 31 projects relative to the front grip area 32, a user can easily hold the front grip area 32. Thus, the projecting front ring 31 serves as a guide for a user holding the front grip area 32, and prevents a hand of the user holding the front grip area 32 from getting into the angle of view of the lens barrel unit 2.

A start/stop button 33 is arranged at a location in the front grip area 32 which is closer to the +Y side. Pressing the start/stop button 33 starts shooting, and pressing the start/stop button 33 again terminates shooting. A space in the front grip area 32 on the −Y side of the start/stop button 33 is a front finger space 34 where a user places his or her fingers when holding the front grip area 32.

A rear appearance of the camera 1 is formed by a rear cover 4. On the rear side of the camera 1, a display 5 and rear operating members 41 are located. The display 5 is comprised of a TFT LCD or the like and includes a touch panel 5a capable of detecting user's touch operations. The display 5 is configured to display image signals (through-the-lens images or live view) of a subject image captured by the image pickup device (which is not illustrated), when the camera 1 is set to a still photo mode or a movie mode while the power of the camera 1 is on.

The display 5 is connected to a camera main body via a display hinge (which is not illustrated). The display hinge has a display rotation axis A1 (FIG. 2A) that is substantially parallel to the camera body in the X direction, and the display 5 is rotatable about 180 degrees on the display rotation axis A1. This enables users to take their selfies while viewing compositions on the display 5.

On the −Y side of the display 5, a rear grip area 42 for a user to hold the camera 1 is provided at a location recessed toward the −Z side relative to the display 5. The rear grip area 42 is located downward relative to the lens barrel unit 2. Since the display 5 projects relative to the rear grip area 42, a user can easily hold the rear grip area 42. Thus, the projecting display 5 serves as a guide for a user holding the rear grip area 42, and prevents a hand of the user holding the rear grip area 42 from getting into the area of the touch panel 5a of the display 5.

The rear operating members 41 are arranged at a location in the rear grip area 42, which is closer to the −Y side. The rear operating members 41 include a power button 43 for turning the camera 1 on and off, and a replay button 44 for issuing an instruction to reproduce recorded shot images. A space in the rear grip area 42 on the +Y side of the rear operating members 41 is a rear finger space 45 where a user places his or her thumb when holding the rear grip area 42.

In the Y direction, the start/stop button 33 is located within the height of the rear finger space 45, and the rear operating members 41 are located within the height of the front finger space 34. The layout of these spaces allows a user to tightly hold an operating member and an opposite finger space with his or her hand to reliably perform a pressing operation.

A side appearance of the camera 1 is formed by the front cover 3 and the rear cover 4. At a location M where the front cover 3 and the rear cover 4 meet, a plurality of external interface connectors (terminals), which is connected to external devices, is arranged. Examples of the external interface connectors include a USB connector 6, an HDMI (High-Definition Multimedia Interface) connector 7, and a microphone jack 8. The USB connector 6 is a power supply connector for supplying power to the camera 1 from the outside, and for example, a USB Type-C connector is adopted as the USB connector 6. The HDMI connector 7 is an image output connector to which an external display is connected, and an HDMI Type-D connector is adopted as the HDMI connector 7. The microphone jack 8 is an audio input connector to which an external microphone is connected, and a connector conforming to the 3.5 mm jack standard is adopted as the microphone jack 8.

The connectors are arranged on the +Y side of the front grip area 32 and the rear grip area 42. This layout is user-friendly because it prevents cables inserted in respective connectors from interfering with a user holding the camera 1 or putting the camera 1 on a desk or other surface.

In a lower half portion of the camera 1, a stand 9 is provided, so that stand side covers 95 and 96 (see FIG. 2B) of the stand 9 form the side appearance of the camera 1. In a state where the stand 9 is retracted, the stand side covers 95 and 96 have sustainably the same shapes as the side shapes of the front cover 3 and the rear cover 4. As a result, the stand side covers 95 and 96 provide a uniform appearance of the camera 1 and do not interfere with a user holding the camera 1. The stand 9 is rotatable on a stand rotation axis A2 (see FIG. 2A) that is substantially parallel to the X direction. With the stand 9, the camera 1 can be tilted, which allows the camera 1 to be placed in a variety of postures for shooting.

An upper appearance of the camera 1 is formed by an upper cover 10. On an upper surface of the upper cover 10, there are provided microphones 101 which are arranged symmetrically left and right about the optical axis L of the lens barrel unit 2, and a speaker 102 which reproduces operating sound and audio of shot movie. Since the microphones 101 are located on the upper surface of the camera 1, differences in sound collection performance when capturing sound reaching from the front and the rear (−Z side, +Z side) of the camera 1 can be reduced.

On a bottom surface of the camera 1, there are provided a tripod mounting portion 35 through which an accessory such as a tripod is mounted or attached to the camera 1, a strap attachment portion 46 through which a strap is threaded, and a recording medium cover 47 (FIG. 1C). The recording medium cover 47 is attached to the camera main body such that it is openable and closable. When the recording medium cover 47 is opened, an unillustrated recording medium, which is an external memory, becomes removable from and attachable to the camera 1.

Figure 2A:
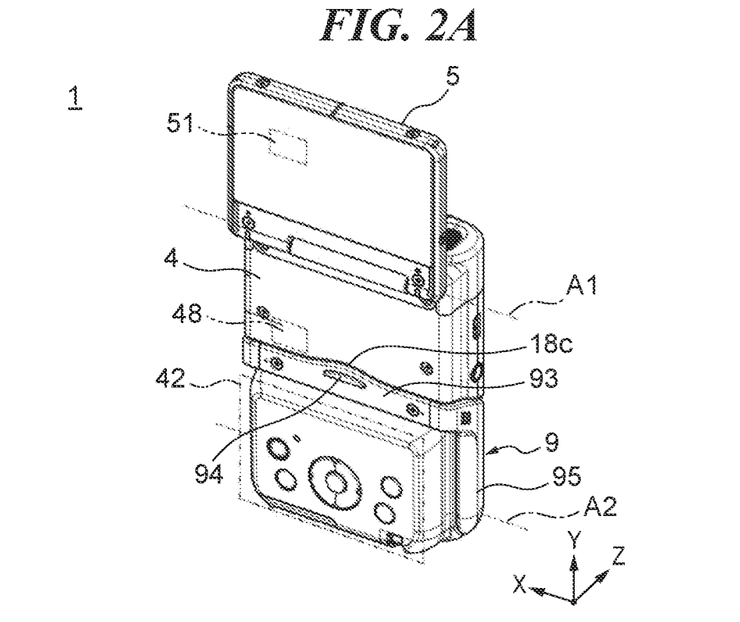
FIGS. 2A and 2B are rear perspective views of the camera.
Figure 2B:
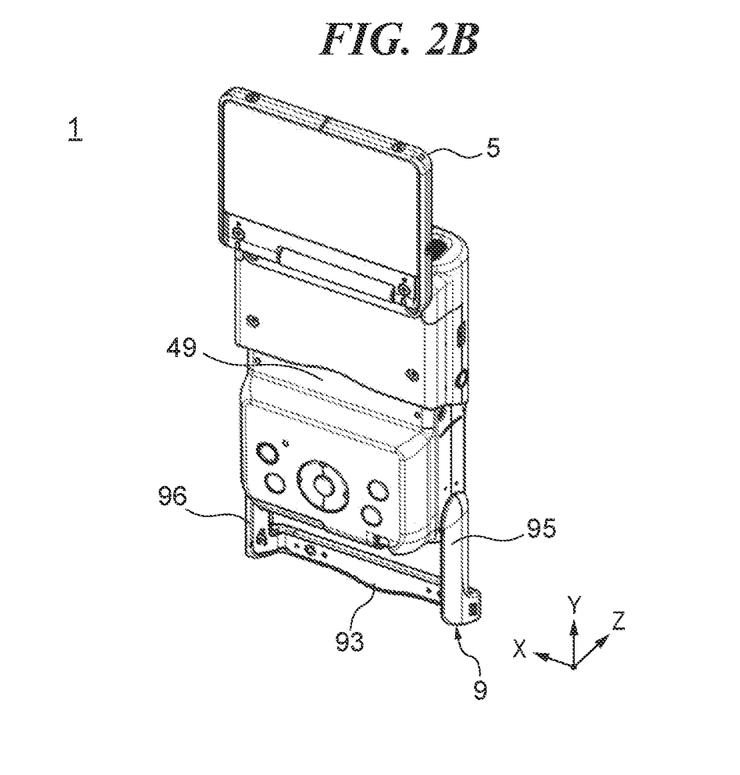

Referring to FIG. 2A and FIG. 2B, a description will be given of how the display 5 and the stand 9 move. FIG. 2A is a rear perspective view of the camera 1 with the display 5 opened and the stand 9 retracted. FIG. 2B is a rear perspective view of the camera 1 with the display 5 opened and the stand 9 standing.

By rotating on the display rotation axis A1, the display 5 is capable of shifting between a retracted state illustrated in FIGS. 1A and 1B and an open state illustrated in FIGS. 2A and 2B. Rotating the display 5 about 180 degrees from the retracted state brings it to the open state. By rotating on the stand rotation axis A2, the stand 9 is capable of shifting between a retracted state illustrated in FIGS. 1A, 1B, and 2A and a standing state illustrated in FIG. 2B. Rotating the stand 9 about 180 degrees from the retracted state brings it to the standing state.

A magnet 51 is arranged inside the display 5, and a yoke 48, which is a magnetic material, is arranged inside the rear cover 4. When the display 5 moves from the open state to the retracted state, the display 5 is subjected to a mechanical suction force generated by the display hinge (which is not illustrated) and a magnetic adsorption force generated by the magnet 51 and the yoke 48. These forces cause the display 5 to automatically move from a certain predetermined angle to the retracted state.

The stand 9 is formed by connecting the stand side covers 95 and 96 via a stand middle cover 93, and the stand side covers 95 and 96 and the stand middle cover 93 rotate together as one unit. A cushioning member 94 (FIG. 2A) is arranged on the stand middle cover 93 so as to reduce collision noise when the display 5 moves to the retracted state.

On the rear cover 4, a stand housing portion 49 that houses the stand middle cover 93 is formed in an area hidden by the display 5 and on the +Y side of the rear grip area 42. Both the display rotation axis A1 and the stand rotation axis A2 are substantially parallel to the X direction, and are located close to the Y-direction ends of the camera 1, respectively. When the stand 9 is in the retracted state, the stand middle cover 93 lies approximately midway between the display rotation axis A1 and the stand rotation axis A2 in the Y direction.

The stand middle cover 93 has a projection 18c at an intermediate position in the X direction. When the stand 9 rotates in a standing direction while the display 5 is in the retracted state, the display 5 is pushed up by the projection 18c. A point of action where the display 5 is pushed up is close to an end of the display 5 rotating on the display rotation axis A1, and hence a user is able to move the stand 9 with small force.

When the stand 9 rotates to a certain predetermined angle, the projection 18c and the display 5 are disengaged from each other, and the display 5 is not pushed up by the stand 9. Then, the display 5 automatically returns to the retracted state due to the mechanical suction force and the magnetic absorption force described above. As a result, when a user wants to use only the stand 9 while keeping the display 5 in the retracted state, it is unnecessary for the user to bring the display 5 to the open state, and hence the user does not have to do troublesome work.

Figure 3A:
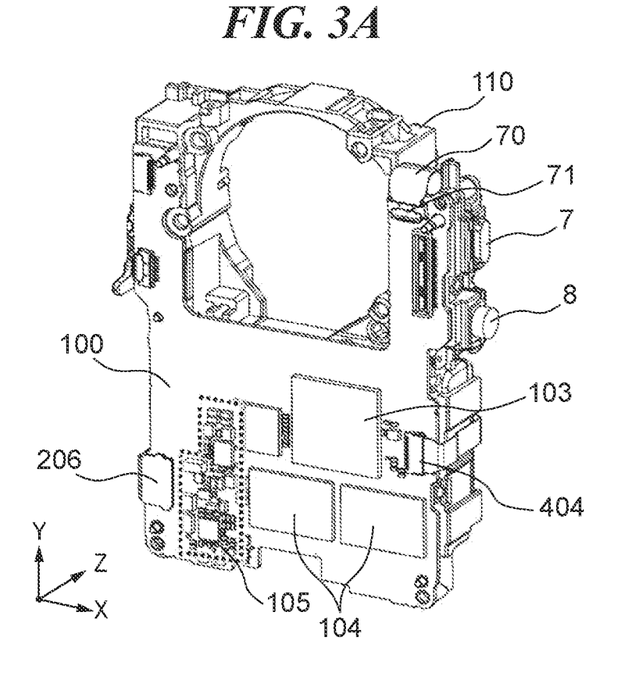
FIGS. 3A and 3B are a rear perspective view and a front perspective view, respectively, of a main body chassis.
Figure 3B:
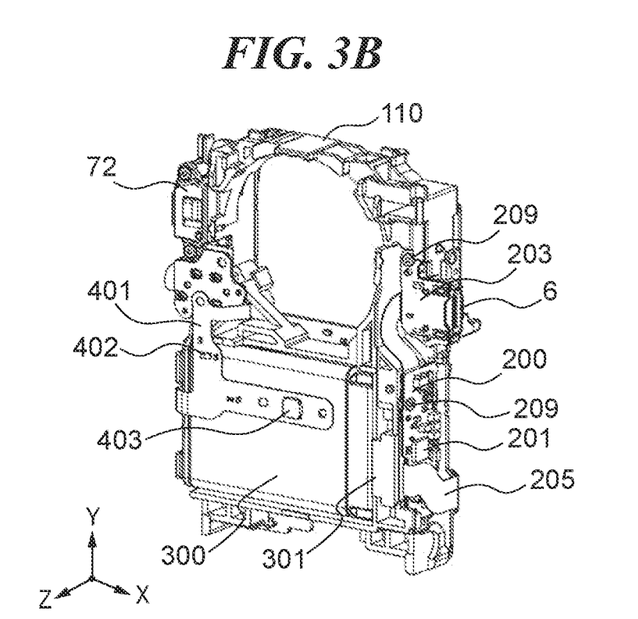

Referring to FIGS. 3A and 3B, a description will be given of how connectors are mounted on the camera 1. FIGS. 3A and 3B are a rear perspective view and a front perspective view, respectively, of a main body chassis. A plurality of exterior members and the lens barrel unit 2 of the camera 1 are not illustrated in FIGS. 3A and 3B.

Onto the main body chassis 110, a main circuit board 100, a power supply circuit board 200, the USB connector 6, the HDMI connector 7, and the microphone jack 8 are fastened by screws 209 or the like. The USB connector 6 is mounted on the power supply circuit board 200. The main body chassis 110 is provided with a battery housing portion 400, in which a battery 300 is to be housed (see FIG. 4A).

The main body chassis 110 is integrally molded of polycarbonate resin. The main body chassis 110 includes a portion that surrounds the lens barrel unit 2. The front cover 3, the rear cover 4, and the upper cover 10 (e.g., FIG. 1A) are fastened to the main body chassis 110 by screws, so that the strength of the camera 1 is improved.

The main circuit board 100 is comprised of a multilayered board and equipped with an image processing engine 103, a memory 104, a power supply circuit 105, and connectors (which are not illustrated) to which other various modules are connected. A flex-rigid circuit board is used as the power supply circuit board 200. The power supply circuit board 200 has a configuration in which a plurality of rigid board portions is connected together by flexible arm portions (flexible printed circuit portions). A rigid board portion on which a charging control IC 201 is mounted is connected to a plurality of rigid board portions by a plurality of flexible arm portions.

The USB connector 6 is mounted on a connector mounting portion 203 connected by a flexible arm portion (which is not illustrated). The USB connector 6 is fastened to the main body chassis 110 by the screw 209 through a screw hole. A positioning hole is provided in the connector mounting portion 203, and the position of the connector mounting portion 203 is restricted by a boss on the main body chassis 110 engaging with the positioning hole.

It should be noted that although in the present embodiment, one USB Type-C connector is mounted as the USB connector 6 on one side of the connector mounting portion 203 in the present embodiment, this is not limitative. In other words, any connector that can be used for supplying power or charging the battery 300 may be mounted on the connector mounting portion 203. Based on the intended use, a plurality of connectors may be mounted on both sides of the connector mounting portion 203.

A main circuit board connector 206 is mounted on a rigid board portion (which is not illustrated) to which a flexible arm portion 205 is connected, so that power from the battery 300 is supplied to the main circuit board 100. A battery connector 301 is mounted on a rigid board portion (which is not illustrated) to which the flexible arm portion (which is not illustrated) is connected. A terminal portion (which is not illustrated) arranged in the battery housing portion 400 and a terminal portion (which is not illustrated) arranged in the battery connector 301 come into contact with each other to establish electrical conduction.

It should be noted that although the flex-rigid circuit board is adopted as the power supply circuit board 200 in the present embodiment, this is not limitative. In other words, a plurality of rigid circuit boards or flexible circuit boards may be used as the power supply circuit board 200, and the circuit boards may be connected using a flexible circuit board. In this case, the circuit boards can be connected in any manner, and for example, they may be connected by connectors, solder, or ACF (Anisotropic Conducting Film). Moreover, a plurality of rigid circuit boards may be combined with a flexible circuit board into a single body.

The HDMI connector 7 is mounted on a flexible circuit board 70 and connected to the main circuit board 100 by a connector 71. The HDMI connector 7 is positioned and held on the main body chassis 110 by a holder member 72. Although in the present embodiment, an HDMI Type-D terminal is adopted as the HDMI connector 7, this is not limitative. For example, any connector that can be used to input and output image signals, such as an HDMI Type-A connector or a USB connector, may be mounted on the flexible circuit board 70.

The microphone jack 8 is mounted on a flexible circuit board 401, positioned relative to the front cover 3, and fastened to the main body chassis 110 by a screw which is not illustrated. It should be noted that although the 3.5 mm jack is adopted as the microphone jack 8, this is not limitative. Any connector that can be used to input and output audio signals can be adopted as the microphone jack 8.

The flexible circuit board 401 is connected to the main circuit board 100 using a connector 404. An audio processing element 402 and a pushbutton switch 403 are mounted on the flexible circuit board 401. The pushbutton switch 403 is arranged at a location corresponding to the start/stop button 33 (FIG. 1A) on the front cover 3.

As described above, the plurality of connectors is connected to the main circuit board 100, which is a control circuit board, by the respective circuit boards (the flexible circuit boards 70, 401, etc.) having flexibility.

Figure 4A:
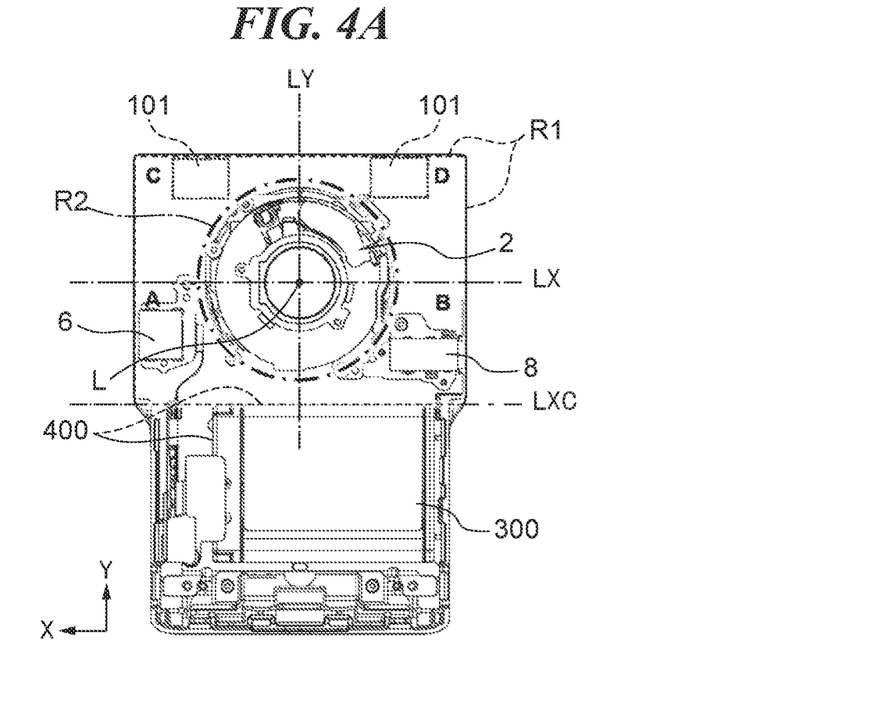
FIG. 4A and FIG. 4B are schematic views of the X-Y cross section of the camera as seen from a −Z side and a +Z side, respectively.
Figure 4B:
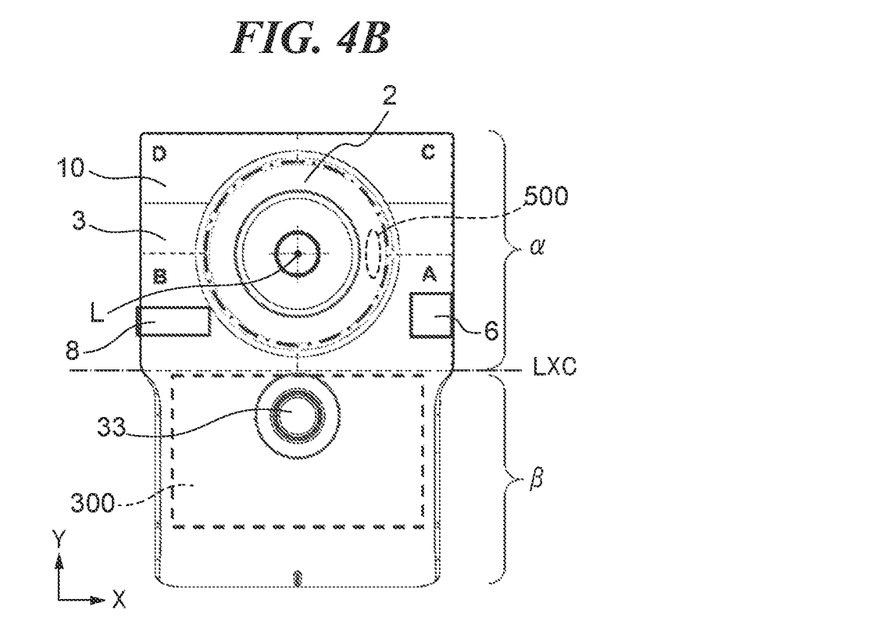

FIG. 4A and FIG. 4B are schematic views of the X-Y cross section of the camera 1 as seen from the −Z side and the +Z side, respectively. A description will now be given of the layout of external interface connectors with focus placed mainly on the USB connector 6 and the microphone jack 8.

The front cover 3, the rear cover 4, and the upper cover 10 constitute the upper half of an exterior body forming the appearance of the camera 1. The battery housing portion 400 is arranged at such a location that the battery housing portion 400 does not overlap the lens barrel unit 2 as seen from the optical axis direction (the Z direction). The battery housing portion 400 is arranged parallel to (in other words, side by side with) the lens barrel unit 2 in the Y direction (first direction) and located on the −Y side of the lens barrel unit 2.

The USB connector 6 and the microphone jack 8 are arranged within a range in the camera main body 1 where the lens barrel unit 2 extends in the optical axis direction. As seen from a certain direction perpendicular to the optical axis L, the USB connector 6 and the microphone jack 8 are included in the range where the lens barrel unit 2 extends.

As seen from the optical axis direction, a virtual straight line parallel to the Y direction and passing through the optical axis L is designated as a first virtual straight line LY, and a virtual straight line parallel to the X direction (second direction) and passing through the optical axis L is designated as a second virtual straight line LX. A virtual straight line parallel to the X direction and passing through an end (upper end) of the battery housing portion 400 facing (on the side closer to) the lens barrel unit 2 in the Y direction is designated as a third virtual straight line LXC.

Out of the outline of the exterior body as seen from the optical axis direction, an outline portion on the +Y side is defined by the upper cover 10, and each of outline portions on the +X side and the −X side is defined by the front cover 3 or the rear cover 4. As illustrated in FIG. 4B, the whole area (an area surrounded by the outline of the exterior body) of the camera 1 as seen from the optical axis direction is broadly divided into a first area α in the upper half and a second area β in the lower half.

As seen from the optical axis direction, a rectangular area surrounded by the outline of the exterior body and the third virtual straight line LXC and including the optical axis L is the first area α. In other words, the first area ax is an area surrounded by the outline of the exterior body and the third virtual straight line LXC and located on the +Y side of the third virtual straight line LXC. As seen from the optical axis direction, a rectangular area on the −Y side (the opposite side from the lens barrel unit 2 in the Y direction) of the third virtual straight line LXC is the second area β.

As illustrated in FIG. 4A, as seen from the optical axis direction, a circular area where the lens barrel unit 2 is present is a lens barrel area R2. As seen from the optical axis direction, an area excluding the lens barrel area R2 from the first area α is an area R1. The area R1 is divided into subareas corresponding to four quadrants around the optical axis L by the virtual straight lines LY and LX. In other words, the area R1 is divided into four subareas A, B, C, and D by the first virtual straight line LY and the second virtual straight line LX. The subareas A and B are two subareas closer to the battery housing portion 400 than the second virtual straight line LX in the Y direction. The subareas C and D are two subareas on the side farther from the battery housing portion 400 than the second virtual straight line LX in the Y direction.

In the present embodiment, a plurality of connectors is arranged in at least two subareas among the four subareas A, B, C, and D. For example, the USB connector 6 is arranged in the subarea A, and the microphone jack 8 is arranged in the subarea B.

Here, the holding portion (the front grip area 32 and the rear grip area 42) to be held by a user is arranged in the second area β (FIGS. 1A, 1B). The operating members and the stand 9 are provided in the second area β. It is thus unpreferable to arrange connectors to which various cables are connected in the second area β because the connectors will interfere with operations such as holding the camera 1, and recording images. The arrangement of the USB connector 6 and the microphone jack 8 in the first area α reduces adverse effects on operability of the camera 1.

The power supply circuit board 200 (FIG. 3B) is arranged in the second area β. Moreover, the USB connector 6 and the microphone jack 8 are arranged in the subareas and within the range where the lens barrel unit 2 extends in the optical axis direction as described above. These arrangements result in that, these components never become a factor that hinders downsizing of the camera 1 in the Z direction, and hence an increase in the size of the camera 1 in the Z direction is prevented.

Furthermore, the USB connector 6 and the microphone jack 8 are arranged in the different subareas. As a result, as compared to an arrangement in which both of the two connectors are in one subarea, the two connectors can be easily arranged such that they do not overlap as seen from the optical axis direction. It is also possible to make the best use of the component arrangement space in both the X direction and the Y direction. This is also advantageous for downsizing of the camera 1.

It should be noted that in each subarea, the dimension of a component that can be arranged increases in the X direction as the distance from the optical axis L increases in the Y direction. Accordingly, in the subarea A, as seen from the optical axis direction, the connector mounting portion 203 on which the USB connector 6 is mounted is arranged such that it does not interfere with the lens barrel unit 2, and the USB connector 6 is arranged such that it does not project from the exterior member. The microphone jack 8 is also arranged at such a location in the Y direction that it does not project from the exterior member in consideration of the size in the X direction.

Moreover, each of the directions in which cables (or inline or cable connectors) are insertable into and removable from the USB connector 6 and the HDMI connector 7 is the X direction. The microphone jack 8 is arranged such that its insertion slot faces the side face of the camera 1 (here, the −X side). Thus, even in a state where cables are connected to the corresponding connectors, a user is able to use the camera 1 without affecting the angle of view in shooting by the lens barrel unit 2 and the visibility of the display 5.

A flexible circuit board 500 for transmitting drive signals in the lens barrel unit 2 is arranged on one side (+X side) of the first virtual straight line LY in the Y direction as seen from the optical axis direction. For example, the flexible circuit board 500 is arranged across the subareas A and C as seen from the optical axis direction (FIG. 4B).

It is feared that the drive signals on the flexible circuit board 500 will affect audio signals input to and output from the microphone jack 8 to generate noise. It is thus preferable that the microphone jack 8 is arranged away from the flexible circuit board 500. Accordingly, as seen from the optical axis direction, the microphone jack 8 is arranged on the opposite side of the first virtual straight line LY from the flexible circuit board 500 in the X direction (for example, in the subarea B on the −X side). It should be noted that, from the same viewpoint, the HDMI connector 7 is also preferably arranged on the opposite side of the first virtual straight line LY from the flexible circuit board 500 in the X direction as seen from the optical axis direction.

As illustrated in FIG. 4A, the two microphones 101 are arranged in the respective subareas C and D. The microphones 101 are preferably arranged such that their sound holes face in the +Y direction in order to prevent the operation of an actuator (which is not illustrated) in the lens barrel unit 2 from affecting sound quality and to reduce changes in frequency characteristics resulting from the body shape of the camera 1.

According to the present embodiment, the battery housing portion 400 is arranged parallel to the lens barrel unit 2 in the Y direction such that it does not overlap the lens barrel unit 2 as seen from the optical axis direction. In the camera 1, the plurality of connectors is arranged in at least two subareas among the four subareas A, B, C, and D, within the range where the lens barrel unit 2 extends in the optical axis direction. As a result, the plurality of connectors can be arranged in the camera 1 while preventing an increase in the size of the camera 1. The plurality of connectors may include a power supply connector, an image output connector, and/or an audio input connector.

Moreover, since the power supply circuit board 200 is arranged in the second area β, an increase in the size of the camera 1 in the optical axis direction is prevented.

Furthermore, the holding portion (the front grip area 32 and the rear grip area 42) is arranged in the second area β, and the connectors (the USB connector 6, the HDMI connector 7, and the microphone jack 8) are arranged in the first area α. Each of the directions in which cables are insertable into and removable from the connectors is the X direction. These allow a user to easily insert and remove cables to or from the connectors while holding the camera 1, and ensure that cables inserted in the connectors do not interfere with a user holding the camera 1, which make the camera 1 easy to use.

In addition, the microphone jack 8 is arranged on the opposite side of the first virtual straight line LY from the flexible circuit board 500 in the X direction as seen from the optical axis direction. This prevents noise caused by drive signals on the flexible circuit board 500 from affecting the microphone jack 8.

Moreover, the USB connector 6 and the microphone jack 8 are arranged in the subareas A and B, respectively, and the microphones 101 are arranged in the subareas C and D. That is, the plurality of connectors is arranged in at least one of the two subareas A and B closer to the battery housing portion 400 than the second virtual straight line LX in the Y direction as seen from the optical axis direction among the four subareas A, B, C, and D, and the microphones 101 are arranged in at least one of the two subareas C and D farther from the battery housing portion 400 than the second virtual straight line LX in the Y direction as seen from the optical axis direction among the four subareas A, B, C, and D. As a result, the space around the lens barrel unit 2 is effectively used, which contributes to preventing an increase in the size of the camera 1.

It should be noted that although the microphone jack 8 is arranged in the subarea B, a connector for image signals such as the HDMI connector 7 may alternatively be arranged in the subarea B.

It should be noted that to arranged a plurality of connectors, the width of wiring on the main circuit board 100 to which the connectors are connected increases with the amount of communication data. Moreover, a shorter wiring length is preferable in consideration of data quality. It is thus preferred that the plurality of connectors is arranged in the subarea A or the subarea B. For example, the HDMI connector 7 may also be arranged in the subarea A or the subarea B.

It should be noted that a plurality of connectors may be arranged inside one subarea depending on the sizes of the connectors. For example, in a case where two or more connectors are arranged in the same subarea among the four subareas, the connectors may be arranged as described below. First, one of the two or more connectors which has the largest dimension in the X direction may be arranged at a location farthest away from the optical axis L in the Y direction among the two or more connectors. This prevents an increase in the size of the camera 1 in the X direction. Alternatively, one of the two or more connectors which has the largest dimension in the Y direction may be arranged at a location farthest away from the optical axis L in the X direction among the two or more connectors. This prevents an increase in the size of the camera 1 in the Y direction.

It should be noted that, in the present embodiment, end positions of the subareas A and B in the −Y direction, which defines the position of the third virtual straight line LXC, correspond to the end position of the battery housing portion 400 on the +Y side (the end of the battery housing portion 400 facing or on the side close to the lens barrel unit 2). Here, the end positions may correspond to either the +Y side end position of the outline of the battery housing portion 400 or the +Y side end position of a space (inner wall) in the battery housing portion 400 where the battery 300 is to be housed.

This, however, is not limitative, but the end positions may be determined based on the end position of the battery housing portion 400 on the +Y side (for example, the end positions may be determined to be positions leaning a predetermined distance toward the +Y side). Alternatively, the end positions may be determined based on the end position of the battery 300 housed in the battery housing portion 400. Alternatively, the end positions may be determined based on the end position of the holding portion (the front grip area 32 and the rear grip area 42) in the +Y direction. Alternatively, the end positions may be determined based on the position of an end of the display 5 when the end of the display 5 lies at a position closest to the −Y side while it rotates.

It should be noted that connectors to which the present invention is applicable are not limited to those described above.

It should be noted that in the present embodiment, the word "substantially" is not intended to exclude completely or exactly. For example, "substantially parallel", "substantially the same", and "substantially in the center" encompass completely parallel, exactly the same, and exactly in the center.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-065580 filed on Apr. 13, 2023 which is hereby incorporated by reference herein in its entirety.

What is claimed is:

1. An image pickup apparatus comprising:
an exterior body;
a lens barrel unit;
a battery housing portion where a battery is to be housed, the battery housing portion being arranged parallel to the lens barrel unit in a first direction perpendicular to a direction of an optical axis of the lens barrel unit such that the battery housing portion does not overlap the lens barrel unit as seen from the direction of the optical axis; and
a plurality of connectors that is to be connected to external devices and is arranged within a range where the lens barrel unit extends in the direction of the optical axis,
wherein the plurality of connectors is arranged in at least two subareas among four subareas formed by dividing, by a first virtual straight line and a second virtual straight line, an area excluding an area where the lens barrel unit is present from a first area surrounded by an outline of the exterior body and a third virtual straight line and including the optical axis as seen from the direction of the optical axis, where the first virtual straight line is a virtual straight line parallel to the first direction and passing through the optical axis, the second virtual straight line is a virtual straight line parallel to a second direction perpendicular to the direction of the optical axis and the first direction and passing through the optical axis, and the third virtual straight line is a virtual straight line parallel to the second direction and passing through an end of the battery housing portion facing the lens barrel unit in the first direction, as seen from the direction of the optical axis.

2. The image pickup apparatus according to claim 1, further comprising a holding portion that is to be held by a user and arranged in a second area on an opposite side of the third virtual straight line from the lens barrel unit in the first direction as seen from the direction of the optical axis.

3. The image pickup apparatus according to claim 1, further comprising a power supply circuit board arranged in a second area on an opposite side of the third virtual straight line from the lens barrel unit in the first direction as seen from the direction of the optical axis.

4. The image pickup apparatus according to claim 1, wherein two or more of the plurality of connectors are arranged in a same subarea among the four subareas, and a connector having the largest dimension in the second direction among the two or more of the plurality of connectors is arranged at a location farthest away from the optical axis in the first direction among the two or more of the plurality of connectors.

5. The image pickup apparatus according to claim 1, wherein two or more of the plurality of connectors are arranged in a same subarea among the four subareas, and a connector having the largest dimension in the first direction among the two or more of the plurality of connectors is arranged at a location farthest away from the optical axis in the second direction among the two or more of the plurality of connectors.

6. The image pickup apparatus according to claim 1, wherein each of directions in which cables are insertable into and removable from the plurality of connectors is the second direction.

7. The image pickup apparatus according to claim 1, further comprising a control circuit board,
wherein the plurality of connectors is connected to the control circuit board by respective circuit boards having flexibility.

8. The image pickup apparatus according to claim 1, further comprising a circuit board that transmits drive signals in the lens barrel unit and is arranged on one side of the first virtual straight line in the second direction as seen from the direction of the optical axis,
wherein at least one of the plurality of connectors is arranged on an opposite side of the first virtual straight line from the circuit board in the second direction as seen from the direction of the optical axis.

9. The image pickup apparatus according to claim 1, wherein the plurality of connectors is arranged in at least one of two subareas closer to the battery housing portion than the second virtual straight line in the first direction as seen from the direction of the optical axis among the four subareas, and
the image pickup apparatus further comprises a microphone arranged in at least one of two subareas farther from the battery housing portion than the second virtual straight line in the first direction as seen from the direction of the optical axis among the four subareas.

10. The image pickup apparatus according to claim 1, wherein the plurality of connectors includes at least one of a power supply connector, an image output connector, and an audio input connector.

* * * * *